July 28, 1942.    L. M. PERSONS    2,291,501
DIFFERENTIAL ADJUSTER
Filed June 8, 1936    3 Sheets-Sheet 2
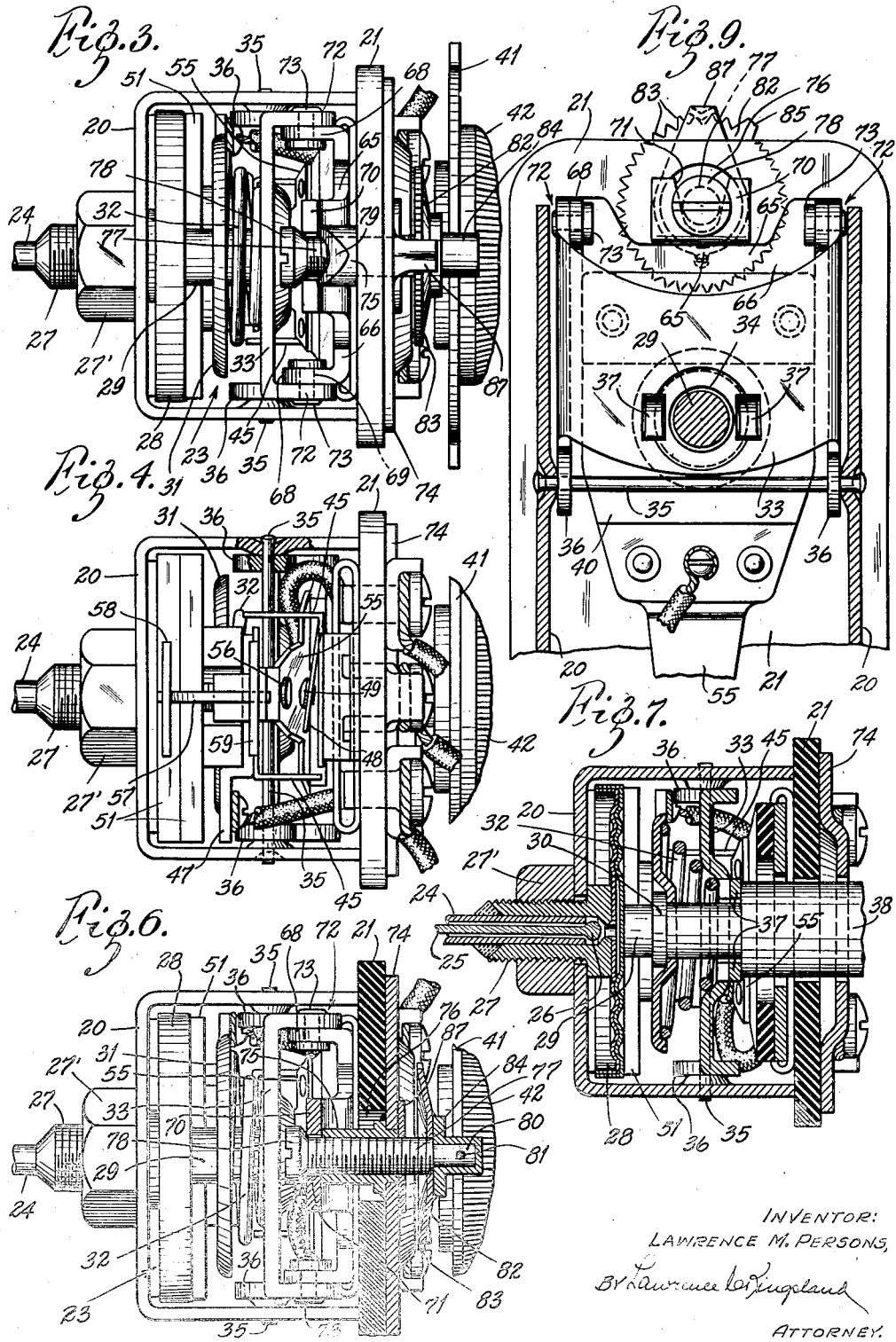
INVENTOR:
LAWRENCE M. PERSONS,
By Lawrence C. Kingsland
ATTORNEY.

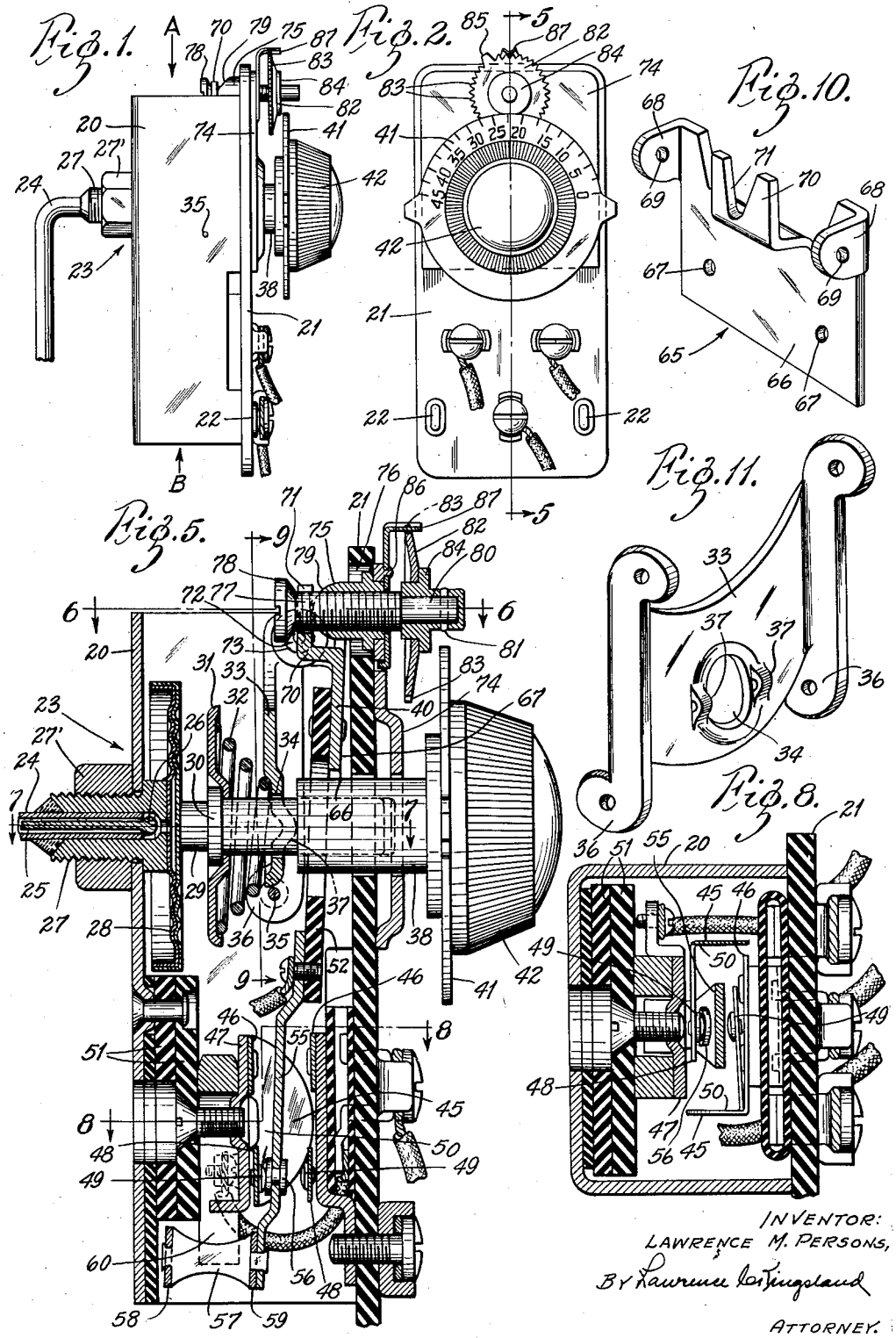

July 28, 1942.                L. M. PERSONS                2,291,501
                           DIFFERENTIAL ADJUSTER
                            Filed June 8, 1936            3 Sheets-Sheet 3
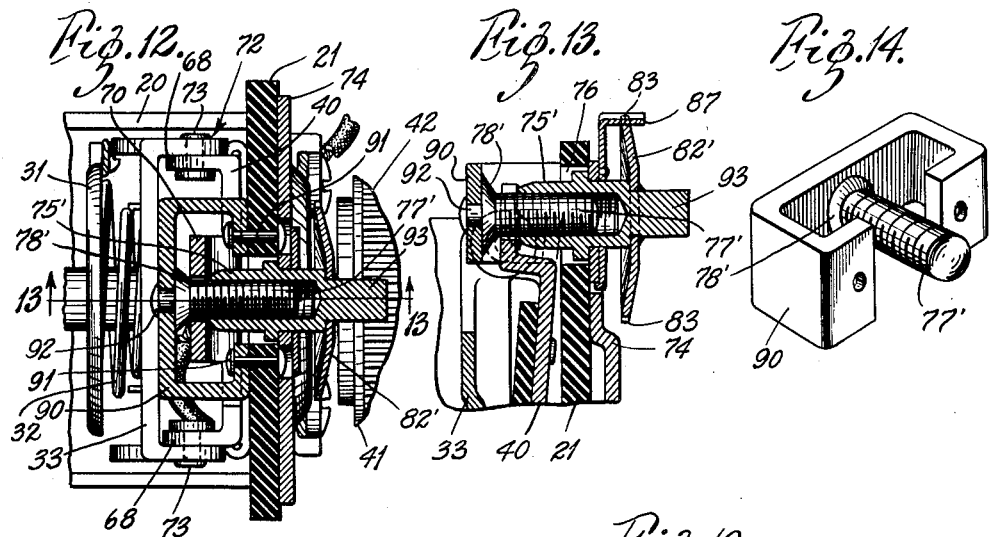
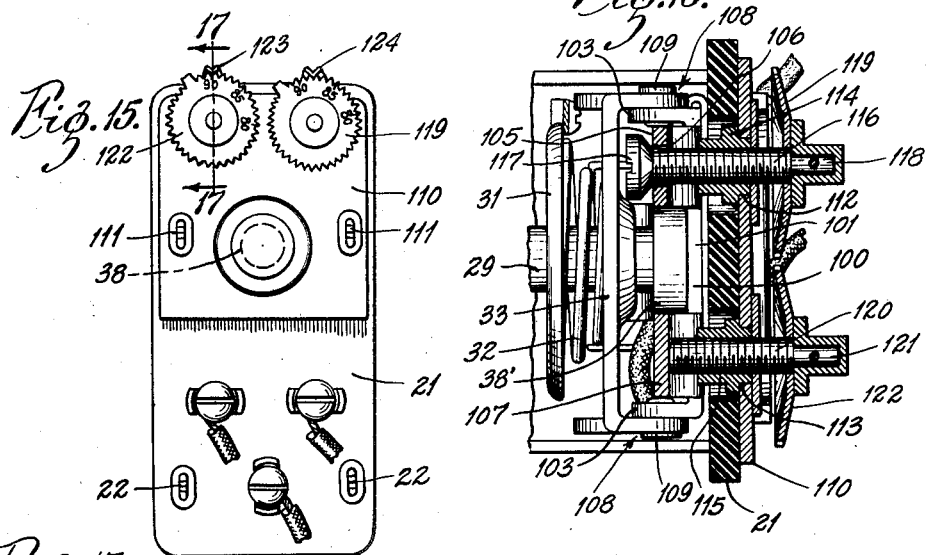
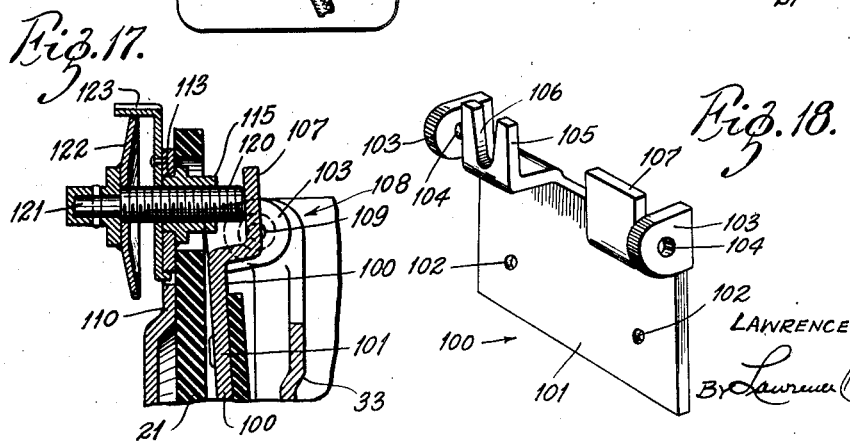
INVENTOR:
LAWRENCE M. PERSONS,
By Lawrence C. Kingsland
ATTORNEY.

Patented July 28, 1942

2,291,501

UNITED STATES PATENT OFFICE 2,291,501

DIFFERENTIAL ADJUSTER

Lawrence M. Persons, St. Louis, Mo., assignor, by mesne assignments, to Automatic Control Corporation, St. Louis, Mo., a corporation of Delaware Application June 8, 1936, Serial No. 84,112

14 Claims. (Cl. 200—83)

The present invention relates generally to switch mechanisms and more particularly to a differential adjuster for thermostat switches. It is well known that thermostat switches, which are set to maintain the temperature of a room, refrigerator, or the like, at a predetermined point, close at one and open at another temperature to establish what is known as a differential to obviate "fluttering," which would result were this not true. To particularize, a switch set to maintain a temperature of 70° F. in a room, and which opens at 70° F., will close when the heat content has dropped to 68° F., thereby establishing a two degree differential between the opening and closing thereof. Heretofore, a certain amount of adjustment for this differential has been obtained by moving the closed setting of the switch contact points relative to magnet, usually employed with such devices to secure snap-action in the closing or opening of the switch. However, this type of adjustment is not adapted to produce the desired results where a solid charge is employed for actuating the switch mechanism, due to the fact that the force effected by the thermal sensitive charge on the mechanism is so great relative to that of the magnetic field.

An object of the present invention is to provide a differential adjusting means adapted to operate in conjunction with a solid charge thermostat switch.

Another object is to provide a manual differential adjusting means which is adapted to adjust in the same direction as the temperature dial.

Another object is to provide a differential adjusting means adapted to be used in conjunction with furnace controls and the like.

Another object is to provide a differential adjusting means adapted to be used in conjunction with refrigerator controls and the like.

Another object is to provide a differential adjusting means wherein the selected differential is obtained by the separate setting of two control dials.

Other objects and advantages of the present invention will appear from the following description, taken in connection with the accompanying drawings in which Fig. 1 is a view in side elevation of a thermostat switch assemblage having an embodiment of the present invention installed in conjunction therewith, the outside cover of the device being removed for clarity.

Fig. 2 is a front elevation of the device shown in Fig. 1.

Fig. 3 is an end elevation looking in the direction of the arrow A shown in Fig. 1.

Fig. 4 is an end elevation looking in the direction of the arrow B in Fig. 1.

Fig. 5 is a section on the line 5—5 of Fig. 2.

Fig. 6 is a section on the line 6—6 of Fig. 5.

Fig. 7 is a section on the line 7—7 of Fig. 5.

Fig. 8 is a section on the line 8—8 of Fig. 5.

Fig. 9 is a view in section on the line 9—9 of Fig. 5.

Fig. 10 is a view in perspective of one modification of a segment of a secondary lever used in the present invention.

Fig. 11 is a view in perspective of a primary lever employed in the present invention.

Fig. 12 is a view on the line 6—6 of Fig. 5, showing a second modification of the differential adjuster.

Fig. 13 is a section on the line 13—13 of Fig. 12.

Fig. 14 is a view in perspective of the mounting means for the screw adjustment shown in Figs. 12 and 13.

Fig. 15 is a front elevation of a thermostat control assemblage showing in connection therewith a still further modification of the present invention.

Fig. 16 is a section on the line 6—6 of Fig. 5 showing the modification of Fig. 15.

Fig. 17 is a section on the line 17—17 of Fig. 15.

Fig. 18 is a view in perspective of a modified form of the secondary lever used in conjunction with the modification of the differential adjuster shown in Figs. 15 through 17.

Referring more particularly to the drawings by reference numerals, a U-shaped frame element 20 is connected to a front plate 21 by peened studs 22, or the like. It is to be understood that a case (not shown) is used to enclose the U-shaped frame element 20 and to fit against the front plate 21. Between and on the frame element and the front plate is mounted the thermostat switch assemblage in conjunction with which the differential adjuster, contemplated by the present invention, is used.

The switch assemblage includes manual setting and actuating means generally designated 23, which are described in detail in my copending application Serial No. 79,735, filed May 14, 1936. For the present invention it will suffice to say that this mechanism includes a tube 24 of substantially uniform cross-section, which encloses actuating fluid, and has a wire section 25, headed at 26, to prevent longitudinal movement therein; an externally threaded sleeve 27 into which the tube 24 and the wire 25 lead, and by which they are connected to the U-shaped frame element 20, the sleeve being held against the element 20 by a nut 27'; a separable diaphragm 28 fixed to the sleeve 27; a stud 29 fixed to the side of the diaphragm remote from the sleeve 27; a circumferential projection 30 fixed to the stud 29; a washer 31 resting against the projection 30; a stiff spring 32, which bears against the washer 31 on one side and against a primary lever 33 at the other side, said primary lever having free sliding movement along the stud 29 by means of an opening 34, and said primary lever being pivoted to the U-shaped frame at 35 at one end by means of the flange portion 36; a secondary lever 40 having free longitudinal movement relative to a sleeve 38 which is threaded onto that end of the stud 29 remote from the diaphragm to contact spaced bosses 37 on the primary lever; and a temperature-setting dial 41 and handle 42 fixed to the sleeve 38.

Preferably the fluid above referred to comprises a liquid that entirely fills the system, so that the unit is what is known as a solid charge device. The present differential adjuster finds especial applicability to solid charge thermostats, because these have inflexible expansion characteristics. Hence, the power of the expanding thermal elements is much greater than that of any snap-action mechanism that may be used. With this greater power, any attempt at adjusting the relatively weak snap-action mechanism to alter the thermostat differential would be ineffective.

Further, the switch assemblage includes switch plates 45, which are described in detail in my co-pending application Serial No. 80,090, filed May 16, 1936, and which form no part of the present invention. It is sufficient to say that each switch plate comprises a leg 46 which is fixed to a switch backing plate 47, a leg 48 which carries a contact 49, and is free relative to the switch backing plate, and a connecting flange 50. The switch backing plate is insulatably mounted on the U-shaped frame element by non-conductive plates 51. In the present embodiment, opposed duplicate switch plates are disclosed.

Working between the opposed contact points is a segment 55 of the secondary lever which carries a double contact 56 for alternately engaging the contacts 49. The segment 55 carries at its end fixed thereto a double armature construction including a non-permeable element 57 which is adapted to be disposed and to move between the legs of a horseshoe magnet 60, and which carries at each end the relatively permeable plates 58 and 59.

Instead of the magnet-armature snap-action just described, other types are contemplated as capable of being used with the present invention. Another such type would be a helical spring set to snap the secondary lever in its make and break actions to opposed off-center positions.

Turning now to an embodiment of the present invention, the secondary lever 40 terminates in a segment, generally designated 65 (Fig. 10), which includes a flat portion 66 having holes 67 therethrough for connecting the segment to an intermediate non-conducting portion 52 of the lever 40, ears 68 having holes 69 therethrough, and an offset portion 70 having the V-shaped notch 71 therein.

In conformance with the present invention, the secondary lever is pivotally connected to the primary lever at 72 by means of pins 73, or the like. There is mounted on the front plate 21 exteriorly of the switch assemblage a plate 74 which is adapted to support in fixed relation a sleeve 75 which extends through the front plate by means of an opening 76 therein. The sleeve 75 is internally threaded and is adapted to adjustably receive a screw 77 having a head 78 about which the V-shaped notch 71 of the projection 70 fits for longitudinal movement relative to the screw between the limits of the screw head 78 and shoulders 79 on the sleeve 75. The screw 77 may have a reduced portion 80 to which is fixed by means of a pin 81, or the like, a hub 84 of a wheel 82, said wheel having serrations 83 around the periphery thereof. The wheel 82 may be fixed to the hub 84, or the parts may be integral. There is fixed to the plate 74 by means of rivets 86, or the like, a stationary detent 87 which is adapted to cooperate with the serrations 83 of the wheel 82 to maintain it in a selected position. The wheel 82 has a projection 85 on the periphery thereof to prevent its complete rotation.

A modification of the differential adjuster shown in Figs. 1 through 11 is disclosed in Figs. 12 through 14, which differs from that just described primarily in the fact that the screw 77' is fixed relative to the front plate 21, and the sleeve 75' moves thereon to effect adjustment, thereby reversing the adjuster construction. To particularize, a U-shaped bracket 90 is fixed to the front plate 21 by rivets 91, or the like. The screw 77' is fixed to the bight of the U by a rivet 92, or the like. The sleeve 75' is adapted to threadedly engage the screw 77', and has secured upon a reduced portion 93 a serrated wheel 82'. In other details, the construction is like that previously described.

A further modification contemplates the use of two differential adjuster dials, in which case the conventional control dial and handle may be omitted where a fixed temperature setting is desirable. Referring to Figs 15 through 18, the switch segment 100 (Fig. 18) has a flat portion 101 having holes 102 therethrough, ears 103 having holes 104 therethrough, an offset portion 105 having a V-opening 106 therein, and a solid offset portion 107. The offset portions 105 and 107 are disposed equally to one side of a point centrally located between the ears 103. The secondary lever is pivotally connected to the primary lever at 108 by pins 109, or the like, in the same manner as the pivot 72. A plate 110 is fixed to the front plate 21 by securing means 111. The plate 110 has openings 112 and 113 therethrough which are adapted to receive in fixed relation the interiorly threaded sleeves 114 and 115, respectively. There is disposed through the sleeve 114 a screw 116 having at one end a head 117 and at the other a reduced portion 118 to which is fixed the peripherally serrated wheel 119. The screw 116 is disposed so that the V-notch 106 of the offset portion 105 engages therearound, as is shown in Fig. 16. There is threadedly engaged in the sleeve 115 a headless screw 120, which like the screw 116, has a reduced portion 121 at one end thereof to which is attached in fixed relation a peripherally serrated wheel 122. The screw 120 is disposed to abut the offset portion 107. Detents 123 and 124 cooperate with the wheels 119 and 122, respectively, to hold them in selected positions.

Thus, the primary lever is limited in one direction of movement by the V-notch 106 of the offset portion 105 engaging the screw head 117, and in the other direction by the offset portion 107 engaging the screw 120. That a movable fulcrum is provided thereby for the secondary lever here, and in the other modifications, will be detailed below.

The adjuster wheels 82, 82', 119 and 122 may be supplied with appropriate numerals to provide definite means for making predetermined differential adjustments. Particularly would numerals be desirable in the modification of Figs. 15-18.

The operation of the device

In the modification of Figs. 1-11, inclusive, the handle 42 is first set to the desired operating temperature. This adjustment of the handle sets the sleeve 38 on the stud 29 inwardly or outwardly relative to the fixed washer 31 and the diaphragm 28. Since the primary lever 33 is maintained by the spring 32 in contact with the sleeve 38, the primary lever, by this adjustment of the handle 42, is rotated about its pivot 35 to obtain a preliminary setting relative to the diaphragm. By this means, the temperature at which the mechanism will be operated is predetermined to any desired value.

In the type of device shown in these figures, the adjustment of the differential is effected on drop of temperature, the point of operation on rise of temperature being fixed. When the fluid in the tube expands to separate the diaphragms and move the stud 29 to the right (Fig. 5), the stiff spring 32 transmits this movement or force to the primary lever 33, which then swings to the right or clockwise and applies a force to the secondary lever at the movable pivot 72. During the first part of this movement, the offset portion 70 of the secondary lever 40 moves freely along the screw 77 away from the head 78, but the switch end of the secondary lever is not moved. During this movement, the lever is stabilized by the holding of the contact end by the snap action magnet. When the offset portion 70 reaches the shoulders 79, this free movement is stopped and thereafter further movement of the primary lever 33 pivots the secondary lever about the shoulders 79 as a fulcrum, this last movement shifting the secondary lever counterclockwise to move the contact 56 into engagement with the right-hand contact 49 of Fig. 5, thus closing the circuit.

When the fluid cools and contracts, the diaphragms again come together. This causes the stud 29 to be drawn to the left, as shown in Fig. 5. The stud draws with it the sleeve 38 which, in turn, swings the primary lever 33 counterclockwise about its pivot 35. It will be seen that this contracting movement is effected solely by the action of the diaphragms in returning together and not by any added springs or the like. The counterclockwise movement of the primary lever 33, through the pivot 72, draws offset portion 70 of the secondary lever along the screw 77 and away from the shoulders 79, the end 55 being held in place by the magnet 60. This movement of the secondary lever is free until the offset portion 70 strikes the head 78 of the screw. When this last occurs, and not until then, the secondary lever 40 is pivoted clockwise about the head 78 as a fulcrum again to break the contact 56 from the contact 49 and to open the circuit.

As has previously been explained, the screw 77 is adjustable by rotation of the wheel 82. Consequently, the extent of the free movement of the offset portion 70 is adjustable. A certain amount of contraction of the temperature-responsive liquid is thus used up in the free movement of the secondary lever without shifting the contact element 56, and this amount is adjustable. Therefore, although the switch closes upon rise of temperature at a relatively fixed value as set by the handle 42, it opens upon drop of temperature at a lower value, the differential between the two temperatures being determined by the adjustment of the wheel 82.

To illustrate the above, if the device is installed on a refrigeration system, the handle 42 may be adjusted to 24°, as shown in Fig. 2. The wheel 82 is then fixed to obtain a two degree differential. In this event, the switch will close when the temperature rises to 24°, and will open when it drops to 22°. If the wheel 82 is subsequently moved to provide a four degree differential, the switch will still close upon rise of the temperature to 24°, but will open only when it drops to 20°. Of course, if the device is employed in a heating system, the circuit will be through the left-hand contact 49, in Fig. 5, and will be opened upon rise of the temperature to the value pre-set by the handle 42, and will close upon drop of the temperature to the preset value, less whatever differential is obtained by adjustment of the wheel 82.

The operation of the modification shown in Figs. 12 through 14 is the same as that shown in Figs. 1 through 11, except that the differential adjustment changes the point of operation upon rise of temperature, the point for drop of temperature being fixed. In this type when, by expansion of the fluid, the offset portion 70 of the secondary lever 40 is moved to the right, in Fig. 5, it will have a certain amount of free movement until it strikes the adjustable sleeve 75', after which further expansion of the liquid will cause the switch to be shifted. Upon subsequent drop of the temperature, the offset portion 70 will be moved to the left until it strikes the fixed screw head 78'. From this, it will be seen that the point of operation upon drop of temperature is changed only by the preliminary setting made by the handle 42; whereas the point of operation upon rise of temperature is determined relative to the predetermined setting by the adjustment of the sleeve 75', this last being effected by rotation of the wheel 82'.

To illustrate the operation of this modification, if the device is installed upon a refrigeration system, the handle may be adjusted to 24°. The wheel 82' may then be fixed to obtain a two degree differential. In this event, the switch will be closed when the temperature rises to 26°, but will open when it drops to the 24° setting. If the wheel 82' is subsequently moved to provide a four degree differential, the switch will then close upon the rise of the temperature to 28°, but will still open when it drops to 24°. It will be understood that this type of differential adjustment, as the preceding modification, can be used with both contacts, as shown in Fig. 5, or either of them, depending upon what type of mechanism is being controlled.

It may be observed further that, if the differential adjustment is located on a fixed part of the switch to the left of the secondary lever, as shown in Figs. 5 and 13, then the operation of these two modifications would be exactly transposed.

The modification shown in Figs. 15 through 18 comprises mechanism for adjusting the differential both on rise of temperature and on drop of temperature. For simplicity, the temperature selection sleeve 38' is set to some temperature value intermediate the two differential extremes and the dial handle eliminated. Upon rise of temperature, the secondary lever pivots about the adjusting screw 120 as a fulcrum by virtue of the contact between the offset portion 107 and this screw. The position of this screw is controlled by the wheel 122 so that the temperature at which the switch mechanism is shifted upon rise of heat is entirely controlled by this adjusting screw 120. Upon drop of temperature, the secondary lever will have free movement until the notched offset 105 strikes the adjustable screw head 117, after which any further drop will shift the switch. The position of the screw head 117 is controlled by the wheel 119, so that the temperature at which the switch is shifted upon drop of heat is entirely controlled by the position of this screw head, such being indicated upon the graduated wheel 119.

As illustrated, the wheel 122 is set for 90° so that the switch is shifted when the temperature rises to this value. Since the wheel 119 is set for 88°, the switch will be shifted in the opposite direction upon drop of the temperature to 88°. Where it is desired to maintain the switch opening temperature at 90°, but to drop the switch closing temperature to 80°, this may be done simply by rotating the wheel 119 to indicate 80°. Correspondingly, should it be desired to maintain the switch closing temperature at 88°, but raise the switch opening temperature to 92°, this may be done simply by rotating the wheel 122 to the 92° value. In other words, full control of both the primary setting and the differential setting is obtained by the two differential wheel adjustments rather than by the sleeve adjustment, as in the previous types.

It will be seen that various differential adjusting means have been provided for mechanism of the kind set forth. It will be understood that an electric switch is merely an illustration of the type of mechanisms that can be operated by the secondary lever. Other mechanisms, such as a gas valve, could be operated thereby. Consequently, in the ensuing claims, the term switch is to be interpreted in a comprehensive sense. Furthermore, while this type of differential adjustment finds particular application to the actuating mechanism shown wherein the expansible member provides power for the operation of the levers in both directions, nevertheless, it could be used where the operation in the return direction is effected through other means, such as a spring.

The location of the differential adjusters is made possible by the design and arrangement of the levers so as to be convenient and accessible, yet without destroying the compactness of the structure. Due to its relation to the two levers, this differential is positive in action, a result not obtainable where a differential mechanism is made a part of the snap-action. As noted, due to the great power of the solid charge expansion, a differential operating on snap-action is not as efficient in such solid charge thermostats as this one. Of course, while the mechanism has been specifically disclosed and is of particular value in connection with a thermostat, it will be understood that the action of the diaphragms could be effected by pure pressure changes rather than by changes in pressure that result from temperature variations.

What is claimed is:

1. In a device of the kind described, in combination with a switch including a front plate, a primary lever, and a secondary lever adapted to be moved by the primary lever, of differential adjusting means including adjustable fulcrum means formed by an internally threaded sleeve fixed to the plate, a headed screw adjustably supported in and extending through the sleeve, an operating wheel fixed to the end of the screw remote from its head to adjust the screw in or out of the sleeve whereby to adjust the distance between the screw head and the sleeve, and means to maintain the wheel in selected position, one of said levers having a fulcrum portion engaging between the head of the screw and the sleeve, the two thereby forming fulcrums for movements of the lever.

2. In a device of the kind described, in combination with a switch including a front plate, a primary lever, and a secondary lever adapted to be moved by the primary lever, of differential adjusting means comprising a pair of fulcrums about which one of the said levers pivots, one fulcrum being adjustable and including a screw fixed relative to the plate, an internally threaded sleeve supported for screw adjustment on the screw, an operating wheel fixed to one end of the sleeve, and means to maintain the wheel in selected position, the lever being adapted to pivot about said sleeve in one direction of its movement.

3. In a device of the kind described, in combination with a switch including a front plate, a primary lever, and a secondary lever adapted to be moved by the primary lever, of differential adjusting means operatively associated with one of the said levers including two internally threaded sleeves fixed to said plate in spaced relation to each other, a headed screw adjustably supported in and extending through one of said sleeves, a headless screw adjustably supported in and extending through the other of said sleeves, an operating wheel fixed to each screw, and means to maintain each wheel in selected position.

4. In a device of the kind described, in combination with a switch including a front plate, a primary lever, and a secondary lever pivoted to the primary lever, said secondary lever having contact means at one end and a notched portion at the other end, an element on the base and passing through the notched portion, opposed fulcrums on said element, one on each side of the lever, said fulcrums being relatively adjustable to adjust the closing and opening differential of the switch.

5. In a device of the kind described, in combination with a switch including a front plate, a primary lever, and a secondary lever pivoted to the primary lever, said secondary lever having contact means at one end and a notched portion and a solid portion at the other end, of differential adjusting means operably associated with the secondary lever including two internally threaded sleeves fixed to said plate in spaced relation to each other, a headed screw adjustably supported in and extending through one of said sleeves to work in the notched portion, a headless screw adjustably supported in and extending through the other of said sleeves to abut the solid portion in certain positions of the secondary lever, an operating wheel fixed to each screw, and means to maintain each wheel in selected position.

6. In a device of the kind described, a liquid containing means including a portion movable in one direction in response to increase of pressure of the liquid and in the other direction in response to decrease in such pressure, a liquid charge entirely filling said means, a lever, and means causing said lever to pivot in response to the movements of said movable portion, said last-named means including two fulcrum elements, said elements being threadedly engaged together, one of them being fixed, and means for rotating one of said fulcrum elements to produce relative movement between the two, and thereby to adjust them, said lever pivoting about one of said elements in one direction of its travel, and about the other in the other direction of its travel.

7. In combination, a solid charge actuated thermostat switch including a lever, a supporting plate, differential adjusting means operatively associated with said lever including two internally threaded sleeves fixed to said plate in spaced relation to each other, a headed screw adjustably supported in and extending through one of said sleeves, a headless screw adjustably supported in and extending through the other of said sleeves, the head portion of said headed screw engaging one side of the lever to constitute a fulcrum therefor in one direction of travel, and the headless screw engaging the other side of the lever to constitute a fulcrum for the opposite direction of travel thereof.

8. In a device of the kind described, a power means, a member engageable with the power means to be moved thereby, a sleeve threaded onto said member, an element adapted to be moved by the member, a spring acting between the member and the element to maintain said element against the sleeve and transmitting movement of the power means in one direction to the element, a cut-off, transmission means interposed between the cut-off and the element for operation of the former by the latter, and differential means for causing said cut-off to be operated at one position of said power means in one direction of its motion, and at another position in the other direction, said sleeve being adjustable to vary the position of the element relative to the power means.

9. In a device of the kind described, a chamber having a diaphragm-type expansible means, a member maintained against the diaphragm for movement therewith as the same expands and contracts, said chamber being entirely filled with liquid, a sleeve threaded for adjustment on said member, a primary element, a spring on said member, and normally maintaining said element against the sleeve, a lever maintained in contact with said primary element to be moved thereby, and a pair of fulcrums, one for each direction of travel of the lever, said fulcrums being relatively adjustable to provide an operating differential for the lever.

10. In a device of the kind described, a frame having front and back elements, a chamber having an expansible means secured to said back element, a member maintained in contact with said expansible means, a sleeve threaded onto said member for adjustment toward and from the expansible means, said sleeve extending through the front element, a handle for rotating said sleeve located in front of the front element, a primary element normally maintained against said sleeve to be moved by the expansible means, a lever adapted to be moved by said primary element, a pair of fulcrums for said lever and secured to the front element, one of said fulcrums being adjustable, means in front of said front element for adjusting said adjustable fulcrum, and said sleeve being adapted to adjust the points of operation of said lever relative to the power means.

11. In a mechanism of the kind described, a base, a lever, and differential adjusting means operatively associated with the lever, including a pair of opposite and spaced fulcrums between which the lever extends, said fulcrums including a headed stud and a sleeve adjustably mounted thereover, one of which is fixed to the base, and the other of which is adjustable on the one, and the lever extending between the stud and sleeve to move against one in one direction of travel, and against the other in the opposite direction of travel.

12. In combination, a thermostat switch including a solid-charge thermal element, a lever adapted to be moved thereby, a supporting plate, differential adjusting means operatively associated with said lever including a fixed and an adjustable fulcrum of the lever having an internally threaded sleeve fixed to the plate, a headed screw adjustably supported in and extending through the sleeve, and an operating wheel fixed to the end of the screw remote from its head, the lever engaging the head of the adjustable screw in its pivotal action.

13. In combination a thermostat switch including a solid-charge thermal element, a lever adapted to be moved thereby, a supporting plate, differential adjusting means operatively associated with said lever, a pair of relatively adjustable fulcrums having a screw fixed relative to the plate, an internally threaded sleeve supported for screw adjustment on the screw, and an operating wheel fixed to one end of the sleeve, the lever engaging the adjustable sleeve in one direction of its movement.

14. In a device of the kind described, a power means, a member engageable with the power means to be moved thereby, an abutment means adjustably mounted on said member and having its abutment surface toward said power means, an element disposed between the abutment surface and the power means and adapted to engage said abutment surface, said abutment means being adapted to follow movements of the power means, means adapted to cause the element to engage the abutment surface for movement with said surface in one direction, and said surface itself being adapted to cause the element to move with the abutment means in the other direction, a cut-off, transmission means interposed between the cut-off and the element for operation of the former by the latter, and differential means for causing said cut-off to be operated at one position of said power means in one direction of its movement, and at another position in its other direction, and said abutment means being adjustable to vary the position of the element relative to the power means.

LAWRENCE M. PERSONS.